US011978410B2

(12) United States Patent
Huang et al.

(10) Patent No.: US 11,978,410 B2
(45) Date of Patent: May 7, 2024

(54) BACKLIGHT CONTROL METHOD AND RELATED DISPLAY DRIVER CIRCUIT FOR VARIABLE REFRESH RATE DISPLAY PANEL

(71) Applicant: NOVATEK Microelectronics Corp., Hsin-Chu (TW)

(72) Inventors: Po-Hsiang Huang, Hsinchu County (TW); Chung-Wen Wu, Yilan County (TW); Jiun-Yi Lin, Taichung (TW); Wen-Chi Lin, Yilan County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/847,199

(22) Filed: Jun. 23, 2022

(65) Prior Publication Data

US 2023/0419915 A1 Dec. 28, 2023

(51) Int. Cl.
*G09G 3/34* (2006.01)
*G09G 3/36* (2006.01)

(52) U.S. Cl.
CPC ........... *G09G 3/342* (2013.01); *G09G 3/3648* (2013.01); *G09G 2310/08* (2013.01); *G09G 2320/0233* (2013.01); *G09G 2320/0257* (2013.01)

(58) Field of Classification Search
CPC ........ G09G 3/34; G09G 3/3406; G09G 3/342; G09G 3/3426; G09G 3/36; G09G 3/3611; G09G 3/3622; G09G 3/3625; G09G 3/364; G09G 3/3644; G09G 3/3648; G09G 2320/0233; G09G 2320/0257
USPC ..................................................... 345/87–104
See application file for complete search history.

(56) References Cited

U.S. PATENT DOCUMENTS 7,724,211 B2 5/2010 Slavenburg
8,276,180 B1 9/2012 Slavenburg
8,797,340 B2 8/2014 Slavenburg
8,994,640 B2 3/2015 Slavenburg
11,651,746 B2 * 5/2023 Cheng ...................... G09G 3/36 345/102
11,804,195 B2 * 10/2023 Huang ................. G09G 3/3618
2005/0068289 A1 * 3/2005 Diefenbaugh ....... G09G 3/3406 345/102
2008/0198181 A1 * 8/2008 Kondo ................ G09G 3/3648 345/690

(Continued)

FOREIGN PATENT DOCUMENTS

TW 202113778 A 4/2021

*Primary Examiner* — Ke Xiao
*Assistant Examiner* — Nelson Lam
(74) *Attorney, Agent, or Firm* — Winston Hsu

(57) ABSTRACT

A method of backlight control for a display panel is provided. The display panel is configured to display with a variable refresh rate in a plurality of frame periods each having a fixed period and a variable period. The method includes steps of: generating a first backlight control signal in the fixed period of a frame period; determining whether a liquid crystal (LC) transition time corresponding to the frame period ends before an end time of the variable period of the frame period; generating a second backlight control signal in the variable period of the frame period when the LC transition time ends before the end time of the variable period of the frame period; and generating a compensation backlight control signal in a next frame period according to a backlight duty cycle of the frame period.

31 Claims, 10 Drawing Sheets

(56) References Cited

U.S. PATENT DOCUMENTS

| | | | | |
|---|---|---|---|---|
| 2013/0307634 A1* | 11/2013 | Chin | H03K 7/08 | 332/109 |
| 2014/0368490 A1* | 12/2014 | Yokonuma | G09G 3/3611 | 345/212 |
| 2015/0054863 A1* | 2/2015 | Tanaka | G09G 3/3406 | 345/691 |
| 2015/0154916 A1* | 6/2015 | Chen | G09G 3/342 | 345/102 |
| 2016/0275916 A1* | 9/2016 | Glen | G09G 5/395 | |
| 2019/0244572 A1* | 8/2019 | Le | G09G 3/3406 | |
| 2019/0253662 A1* | 8/2019 | Kim | H04N 7/0127 | |

* cited by examiner

BACKLIGHT CONTROL METHOD AND RELATED DISPLAY DRIVER CIRCUIT FOR VARIABLE REFRESH RATE DISPLAY PANEL

BACKGROUND OF THE INVENTION

1. Field of the Invention

The present invention relates to a control method for a display panel, and more particularly, to a backlight control method for a display panel and a display driver circuit configured to perform the backlight control method.

2. Description of the Prior Art

Variable refresh rate (VRR) is a novel technique used for a display panel, to allow the refresh rate of the display panel to change adaptively based on the current processing speed of the video provider such as a graphics processing unit (GPU). This avoids some visual effect problems such as the tearing effect and image sticking when the GPU is too busy to output the image frames in time.

As for backlight control of the display panel applying the VRR, the synchronous backlight control scheme may not be feasible. In the synchronous backlight control scheme, the backlight control signal is synchronous to the vertical synchronization signal of the input image; hence, the duty cycles of the backlight control signals will not be consistent in different frame periods since the length of a frame period is variable, and the continuously varied duty cycle will generate a blinking image. If the asynchronous backlight control scheme is applied, the pulses of the backlight control signal are output in a predetermined frequency irrespective of the variations of frame rate. However, in the asynchronous backlight control scheme, the output pulses may easily overlap the liquid crystal transition time, therefore blurring the display image.

Thus, there is a need for providing a backlight control method capable of providing the synchronous backlight control function and also providing a stable and controllable duty cycle of the backlight control signal that can be used in the VRR applications.

SUMMARY OF THE INVENTION

It is therefore an objective of the present invention to provide a novel backlight control method and a display driver circuit configured to perform the backlight control method, so as to solve the abovementioned problems.

An embodiment of the present invention discloses a method of backlight control for a display panel. The display panel is configured to display with a variable refresh rate in a plurality of frame periods, each having a fixed period and a variable period. The method comprises steps of: generating a first backlight control signal in the fixed period of a first frame period among the plurality of frame periods; determining whether a liquid crystal transition time corresponding to the first frame period ends before an end time of the variable period of the first frame period; generating a second backlight control signal in the variable period of the first frame period when the liquid crystal transition time ends before the end time of the variable period of the first frame period; and generating a compensation backlight control signal in a second frame period next to the first frame period according to a backlight duty cycle of the first frame period.

Another embodiment of the present invention discloses a display driver circuit for performing backlight control for a display panel. The display panel is configured to display with a variable refresh rate in a plurality of frame periods, each having a fixed period and a variable period. The display driver circuit comprises a first signal generator, a main control circuit and a second signal generator. The first signal generator is configured to generate a first backlight control signal in the fixed period of a first frame period among the plurality of frame periods. The main control circuit is configured to determine whether a liquid crystal transition time corresponding to the first frame period ends before an end time of the variable period of the first frame period. The second signal generator is configured to generate a second backlight control signal in the variable period of the first frame period when the liquid crystal transition time ends before the end time of the variable period of the first frame period, and generate a compensation backlight control signal in a second frame period next to the first frame period according to a backlight duty cycle of the first frame period.

Another embodiment of the present invention discloses a display driver circuit for performing backlight control for a display panel. The display panel is configured to display with a variable refresh rate in a plurality of frame periods, each having a fixed period and a variable period. The display driver circuit comprises a signal generator and a main control circuit. The signal generator is configured to generate a first backlight control signal in the fixed period of a first frame period among the plurality of frame periods. The main control circuit is configured to determine whether a liquid crystal transition time corresponding to the first frame period ends before an end time of the variable period of the first frame period. The signal generator is further configured to generate a second backlight control signal in the variable period of the first frame period when the liquid crystal transition time ends before the end time of the variable period of the first frame period, and generate a compensation backlight control signal in a second frame period next to the first frame period according to a backlight duty cycle of the first frame period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
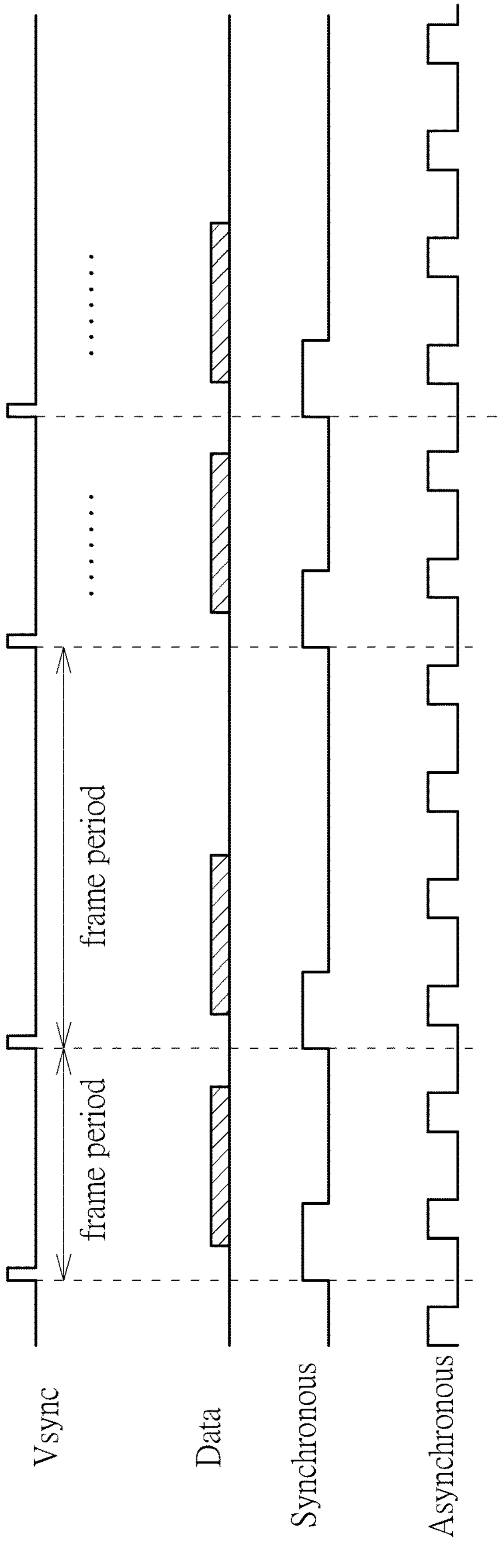
FIG. 1 is a waveform diagram of general backlight control schemes for a VRR display system.

FIG. 1 is a waveform diagram of general backlight control schemes for a variable refresh rate (VRR) display system. In the VRR display system, a display driver circuit may receive display data from a video provider, and correspondingly receive or generate a vertical synchronization signal Vsync. The display driver circuit then converts the display data into a data voltage to be output to a display panel, and correspondingly outputs a backlight control signal to control the backlight timing of the display panel.

As shown in FIG. 1, each pulse of the vertical synchronization signal Vsync indicates the start of a frame period. Since the refresh rate is variable, these frame periods have different lengths. Each frame period has an active period in which a frame of display data is received, and the remainder time period is a blank period. In general, the length of the active period in each frame period may be consistent since each frame of display data has a fixed size; hence, the VRR is controlled by adjusting the length of the blank period.

FIG. 1 illustrates the backlight control signals of the synchronous backlight control and asynchronous backlight control schemes. In the synchronous backlight control scheme, the backlight control signal has a series of pulses, each synchronous to the vertical synchronization signal Vsync in a frame period and having the same pulse width under the same brightness setting. Since the length of the frame period is not fixed, the synchronous backlight control results in an unstable duty cycle, such that the display image will be blinking. In the asynchronous backlight control scheme, the pulses of the backlight control signal have a predetermined frequency irrespective of the variations of frame rate. These pulses may easily overlap the liquid crystal (LC) transition time. In such a situation, the backlight illuminates at the time when the LC molecules in the display panel change their states, which easily causes the display image to become blurred.

The present invention provides a method of backlight control in the VRR display system, for controlling the duty cycle to be consistent while reducing the image sticking, blurring and blinking on the display image. In an embodiment, a frame period may be separated into a fixed period and a variable period, where the fixed period may be the active period and the variable period may be the blank period. The first backlight control signal having one pulse is allocated to each fixed period, and a second backlight control signal allocated to the variable period may include a series of small pulses to achieve a specific backlight duty cycle based on the duty cycle of the small pulses, to be adaptive to the variable length of the variable period. In addition, if the actual pulse width of the second backlight control signal fails to reach the desired backlight duty cycle, a compensation pulse may be output in the next frame period to compensate for the backlight duty cycle of the present frame period. Accordingly, the display image will not be blurred, especially when the refresh rate becomes extremely low.

Figure 2A:
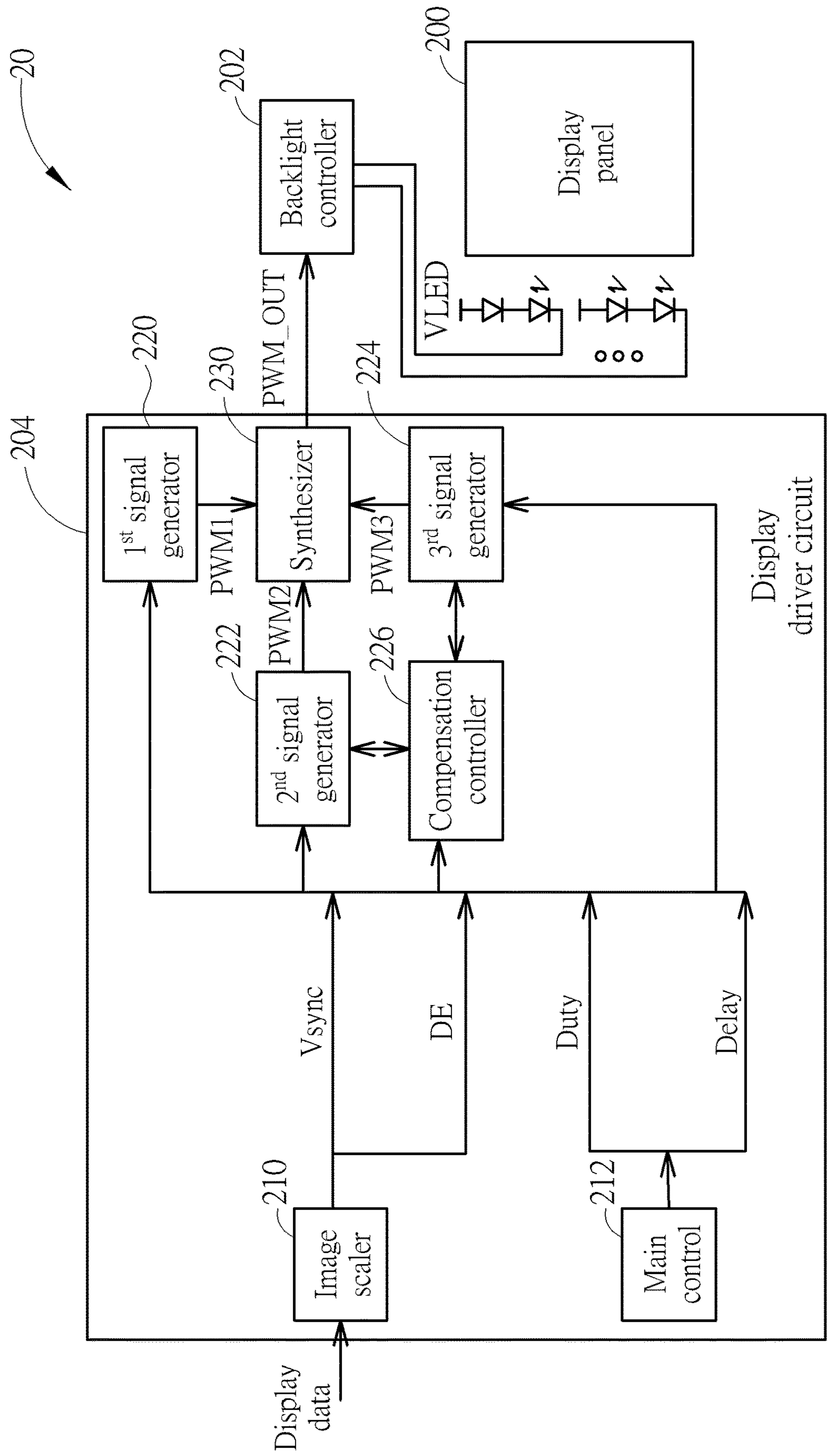
FIG. 2A and FIG. 2B are schematic diagrams of a display system according to embodiments of the present invention.

FIG. 2A is a schematic diagram of a display system 20 according to an embodiment of the present invention. As shown in FIG. 2A, the display system 20 includes a display panel 200, a backlight controller 202 and a display driver circuit 204. The backlight of the display panel 200 may be provided by deploying a light-emitting diode (LED) array. The LEDs in the LED array may emit light when receiving the corresponding driving voltage VLED, and the emission time is determined by the backlight controller 202, which may output currents to each channel of LEDs to control their emission time based on one or more backlight control output signals received from the display driver circuit 204. The backlight controller 202, which includes current sources for providing currents to drive the LED array, may be a control circuitry integrated in the display panel 200 or a stand-alone control circuitry.

The display driver circuit 204 is configured to generate the backlight control output signal and provide the backlight control output signal for the backlight controller 202 and the display panel 200. In an embodiment, the display driver circuit 204 is also configured to provide display data for the display panel 200. Examples of the display driver circuit 204 include a source driver integrated circuit (IC), but not limited thereto. As shown in FIG. 2A, the display driver circuit 204 includes an image scaler 210, a main control circuit 212, a first signal generator 220, a second signal generator 222, a third signal generator 224, a compensation controller 226, and a synthesizer 230.

The image scaler 210 is configured to receive display data from a front-end video provider such as a graphics processing unit (GPU), and modify the display data to be adaptive to the resolution of the display panel 200. In general, the resolution of the source video received from the video provider may be lower than the resolution of the display panel 200; hence, the image scaler 210 may expand the display data by inserting interpolated data into the original display data. In addition, the image scaler 210 may generate a vertical synchronization signal Vsync and a data enable signal DE based on the modified display data, and output the vertical synchronization signal Vsync and the data enable signal DE to the backlight signal generators. Alternatively, the vertical synchronization signal Vsync and/or the data enable signal DE may be provided from the video provider. Note that the vertical synchronization signal Vsync indicates the start of each frame period, and the data enable signal DE indicates the active period in which the display data are output to the display panel 200 and the blank period in which no display data is output. The vertical synchronization signal Vsync and the data enable signal DE allow the backlight signal generators to generate the backlight control signals with appropriate timing.

The main control circuit 212 is configured to provide other information for generating the backlight control signals. Such information includes, but not limited to, the backlight duty cycle and delay information. For example, in order to prevent a backlight control signal from overlapping the LC transition time, the delay information associated with the LC transition time is provided for the backlight signal generators, so as to output a pulse in an appropriate time point without interacting with the LC transition to cause blurred images. In addition, the backlight duty cycle is used to determine the pulse widths of the backlight control signals, so as to generate desired brightness. In an embodiment, the main control circuit 212 may be a microcontroller unit (MCU) or any other type of control circuit or device.

The first signal generator 220, the second signal generator 222 and the third signal generator 224 are configured to generate a backlight control signal PWM1, a backlight control signal PWM2 and a backlight control signal PWM3, respectively. Each of these signal generators may be a pulse width modulation (PWM) generator used for generating pulse signals as the backlight control signals PWM1, PWM2 and PWM3, and controlling the pulse widths and timing. The pulses of the backlight control signals PWM1, PWM2 and PWM3 may be output with different patterns, e.g., different frequencies, widths and/or timing.

In detail, the first signal generator 220, the second signal generator 222 and/or the third signal generator 224 may receive the vertical synchronization signal Vsync and/or the data enable signal DE from the image scaler 210, and also receive the information of backlight duty cycle and/or delay time from the main control circuit 212, so as to determine the timing and width of the pulses in the backlight control signals PWM1, PWM2 and PWM3. In addition, the first signal generator 220, the second signal generator 222 and the third signal generator 224 may be negotiated with each other to avoid overlapping of their pulses. In an embodiment, each of the first signal generator 220, the second signal generator 222 and the third signal generator 224 may include a counter for counting the pulse width and the delay time based on the information of backlight duty cycle and delay received from the main control circuit 212.

The compensation controller 226 is configured to calculate the compensation pulse to be output by the second signal generator 222 or the third signal generator 224. As mentioned above, the display driver circuit 204 may output a compensation pulse in the next frame period to compensate for the backlight duty cycle of the present frame period, so as to keep the backlight duty cycle consistent. The compensation controller 226 aims at calculating and determining the width of the compensation pulse. For example, based on the expected pulse width corresponding to the backlight duty cycle of the frame period and the summation of pulse widths of the backlight control signals that are already generated, the compensation controller 226 may calculate the residual pulse width of this frame period, so as to determine the compensation pulse width. In an embodiment, the compensation controller 226 may include a counter for counting the residual pulse width, allowing the second signal generator 222 or the third signal generator 224 to output the compensation pulse based on the counting result.

The synthesizer 230 is configured to combine the backlight control signals PWM1, PWM2 and PWM3 generated by the first signal generator 220, the second signal generator 222 and/or the third signal generator 224, to generate a backlight control output signal PWM_OUT, and output the backlight control output signal PWM_OUT to the backlight controller 202. With the above compensation scheme performed by the compensation controller 226, the combination of the backlight control signals PWM1, PWM2 and PWM3 will achieve a desired backlight duty cycle.

Figure 2B:
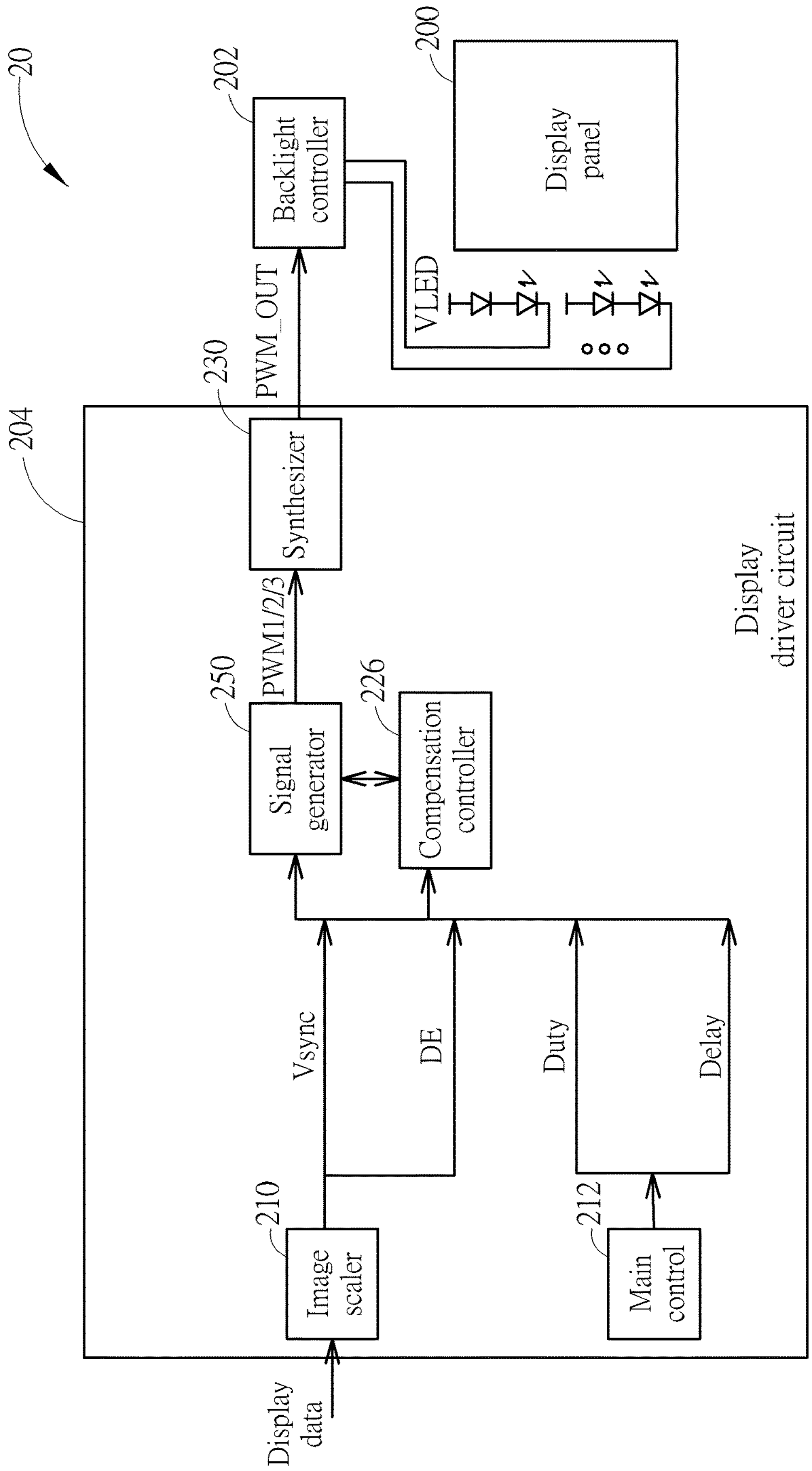

In the embodiment as shown in FIG. 2A, the backlight control signals PWM1, PWM2 and PWM3 are generated by the first signal generator 220, the second signal generator 222 and the third signal generator 224, respectively. In another embodiment, these signal generators may be integrated in a single signal generator; that is, the backlight control signals PWM1, PWM2 and PWM3 may be generated by the same signal generator. FIG. 2B illustrates a related implementation where a display system 25 includes only one signal generator 250 used to generate and output the backlight control signals PWM1, PWM2 and/or PWM3. Other signals and elements shown in FIG. 2B are similar to those shown in FIG. 2A, and thus denoted by the same symbols. The operations of these circuit elements are similar to those in the display system 20 as shown in FIG. 2A, and will not be narrated herein.

Figure 3:
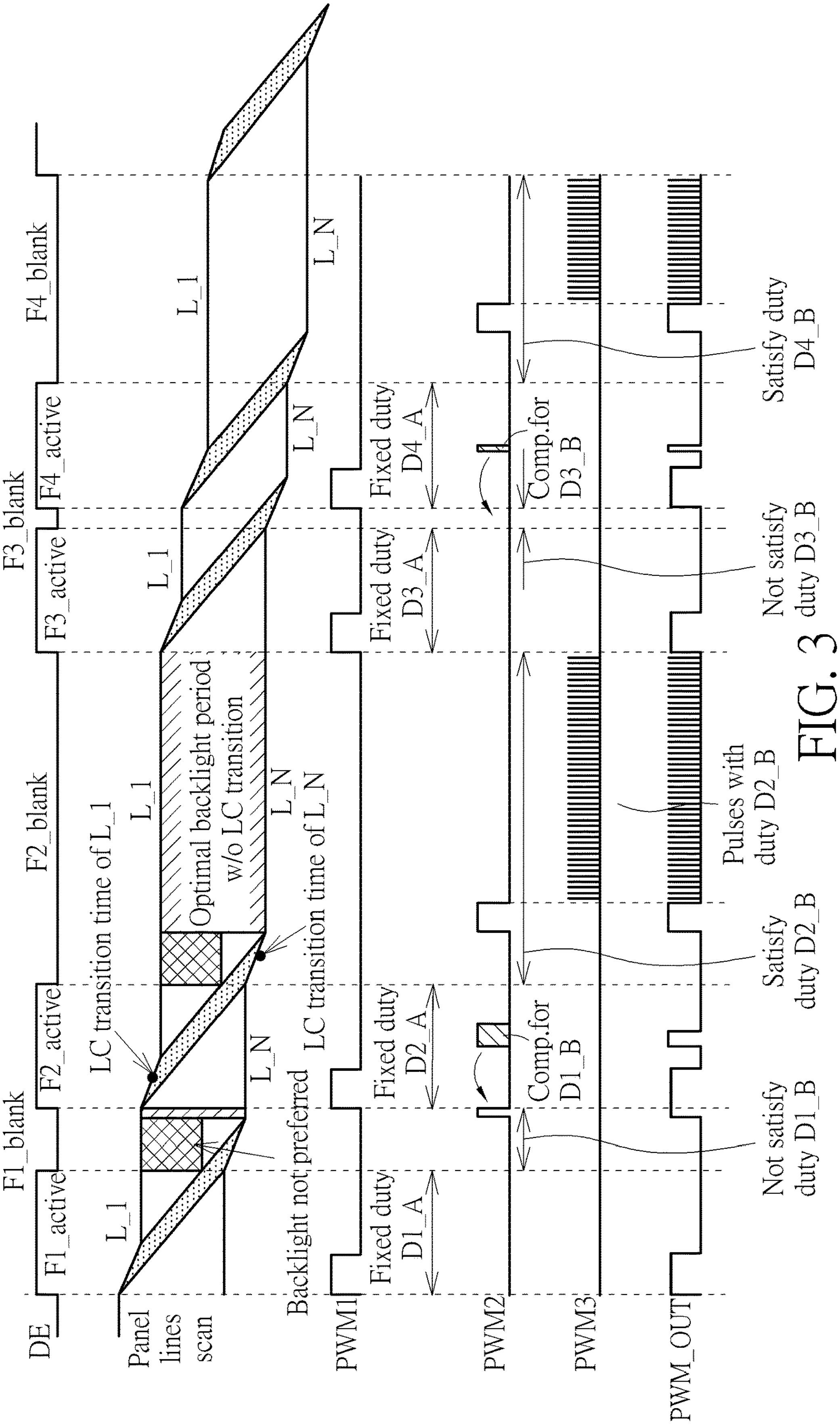
FIG. 3 is a waveform diagram of a backlight control scheme for a VRR display system according to an embodiment of the present invention.

FIG. 3 is a waveform diagram of a backlight control scheme for a VRR display system according to an embodiment of the present invention. The VRR display system may be the display system 20 as shown in FIG. 2A or the display system 25 as shown in FIG. 2B. FIG. 3 illustrates the waveforms of the data enable signal DE, the backlight control signals PWM1-PWM3, and the backlight control output signal PWM_OUT. The scanning of display operations performed on the lines of pixels on the display panel 200 is also illustrated. The data enable signal DE in a "High" level represents the active period where a frame of display data is received, and in a "Low" level represents the blank period where no display data is received. The display operations sequentially scan from the first line L_1 to the last line L_N in each active period. When a line of pixels are scanned and receive the display data, the LC molecules need a little time to change their states, i.e., from the state corresponding to the previous display data to the state corresponding to the currently received display data. This time is called "LC transition time". As shown in FIG. 3, after the frame of display data is completely received at the end of the active period, an additional short time is required to complete the transition of LC molecules in the last few lines, such that the LC transition time lasts for a short time after the end of the active period.

Note that the length of the LC transition time may be predicted and determined in advance. In an embodiment, the characteristics of the LC molecules in the display panel 200 may be measured to obtain the appropriate LC transition time, and the related information may be stored in the main control circuit 212, to be taken to determine the delay of the backlight control signals. As mentioned above, it is preferable to let the backlight to illuminate at the time without LC transition to avoid the blurred images; hence, the pulses of the backlight control signals may be generated after the LC transition time in the blank periods, as shown in FIG. 3.

In this VRR display system, the frame periods F1-F4 have different lengths. Since the size of each frame of display data is identical, the active period for receiving the display data may have a fixed length, as could be considered as a fixed period; hence, the length of the blank period will be different in different frame periods F1-F4, and the blank period could be considered as a variable period. Since the display driver circuit 204 does not know the length of the present blank period until the next frame of display data is received or the indication such as a vertical synchronization signal Vsync or a data enable signal DE arrives, it is hard to achieve the desired backlight duty cycle at the end of a frame period. Therefore, after the frame period ends, the display driver circuit 204 will know the length of the blank period and the pulse widths already output, and thereby calculate the residual pulse width of the compensation pulse, e.g., by the compensation controller 226, and output the compensation pulse in the next frame period. In such a situation, the overall backlight duty cycle may still achieve its desired value.

As shown in FIG. 3, the first signal generator 220 (or the signal generator 250) may generate the backlight control signal PWM1 for the active period, where the backlight control signal PWM1 includes a pulse in each active period, and the pulse width satisfies the backlight duty cycle of the active period of the frame period (D1_A-D4_A). Supposing that the frame periods F1-F4 are configured with the same backlight duty cycle (i.e., D1_A-D4_A are equal), the pulse width of the backlight control signal PWM1 in each active period may be identical, so as to achieve the fixed backlight duty cycle of the active period.

The second signal generator 222 (or the signal generator 250) may generate the backlight control signal PWM2 for the blank period. In order to prevent the pulses of the backlight control signal PWM2 from overlapping the LC transition time to avoid the display image to become blurred, the backlight control signal PWM2 may start at a time point determined according to the LC transition time. More specifically, the pulse of the backlight control signal PWM2 may be delayed to start at or after the end of the LC transition time, and the pulse width is requested to satisfy the backlight duty cycle of the blank period (D1_B-D4_B) in consideration of the length of the LC transition time. However, due to the uncertain length of the blank period, if the blank period is not long enough to contain the expected width of the pulse that satisfies the desired backlight duty cycle, an additional compensation pulse in the next frame period will be necessary. On the other hand, if the blank period is too long and lasts for a period of time after the pulse of the backlight control signal PWM2 ends, additional pulses in the blank period are also required to satisfy the desired backlight duty cycle of the blank period.

In another embodiment, if the pulse of the backlight control signal PWM2 cannot be ideally allocated after the end of the LC transition time, it may be required to start earlier and have slight overlapping with the LC transition time. As long as the backlight control signal PWM2 is allocated according to the LC transition time, the related implementation should belong to the scope of the present invention.

In addition, based on the LC transition time, the main control circuit 212 may further determine whether the LC transition time ends before the end time of the blank period. If the blank period is extremely short such that the LC molecules fail to complete their transition in the blank period, no pulse of the backlight control signal PWM2 could be generated in the blank period. The pulse of the backlight control signal PWM2 may be generated in the blank period only when the LC transition time ends during the blank period (i.e., ends before the end time of the blank period).

In the frame period F1, the expected width of pulse should satisfy the backlight duty cycle D1_B of the blank period, but the blank period is not long enough such that the pulse width of the backlight control signal PWM2 fails to reach the expected width. Therefore, the pulse ends at the end time of the blank period of the frame period F1. In such a situation, a compensation pulse to compensate for the pulse of the backlight control signal PWM2 is necessary. The second signal generator 222 (or the signal generator 250) may output the compensation pulse in the active period of the next frame period F2, as the backlight control signal PWM2 shown in FIG. 3.

In such a situation, the width of the compensation pulse may be equal to the expected pulse width of the backlight control signal PWM2 minus the actual pulse width of the backlight control signal PWM2 in the blank period. The pulse width may be obtained from the compensation controller 226, which calculates the residual pulse width according to the backlight duty cycle and thereby determines the width of the compensation pulse. Please also note that the compensation pulse of the backlight control signal PWM2 in the next active period should be staggered with the pulse of the backlight control signal PWM1 for the next frame period; that is, the compensation pulse should be output in a time period that may not overlap the pulse of the backlight control signal PWM1, so as to ensure an accurate duty cycle after combination of the synthesizer 230. Therefore, based on the position of the pulse of the backlight control signal PWM1, corresponding delay information is provided for the second signal generator 222 (or the signal generator 250) to output the compensation pulse with an appropriate delay time. As show in FIG. 3, the compensation pulse for the blank period of the frame period F1 is generated in the active period of the frame period F2 after the end of the pulse of the backlight control signal PWM1 for the frame period F2.

In the frame period F2, the blank period is long enough to contain a pulse having the expected width that satisfies the desired backlight duty cycle D2_B of the blank period; hence, the actual pulse width of the backlight control signal PWM2 in the blank period is equal to the expected width. Since the blank period lasts for a period of time after the pulse of the backlight control signal PWM2 ends, the third signal generator 224 (or the signal generator 250) is applied to generate the backlight control signal PWM3 to achieve the desired backlight duty cycle. In this embodiment, the backlight control signal PWM3 includes a series of small pulses, and the duty cycle of the small pulses is identical to the desired backlight duty cycle D2_B to be achieved in the blank period. Therefore, the overall duty cycle of the blank period can approach the desired backlight duty cycle D2_B, and the number of the series of small pulses may correspond to the length of the blank period; that is, the longer the blank period, the more the pulse number. Since the actual duty cycle of the blank period approaches the desired backlight duty cycle D2_B, no compensation pulse is required in the next frame period.

As shown in FIG. 3, the frame period F2 shows an extremely low frame rate where the blank period is quite long. Since the blank period lasts for a long time after the LC molecules completely change their states, it has an optimal period where the backlight can illuminate without blurred images caused by LC transition.

The frame period F3 shows another situation where the blank period is extremely short such that the LC molecules have not completely changed their states at the end of the blank period. In such a situation, the pulse of the backlight control signal PWM2 is not generated in the blank period of the frame period F3. Therefore, the corresponding compensation pulse may still be calculated based on the desired backlight duty cycle D3_B and generated in the active period of the next frame period F4. The compensation controller 226 may calculate the residual pulse width based on the desired backlight duty cycle D3_B and the length of the blank period, thereby determining the compensation pulse width generated in the active period of the next frame period F4.

In the frame period F4, the blank period is long enough to contain a pulse having the expected width that satisfies the desired backlight duty cycle D4_B of the blank period. The detailed operations of the backlight control signals in the frame period F4 are similar to those in the frame period F2, and will not be repeated herein.

Figure 4:
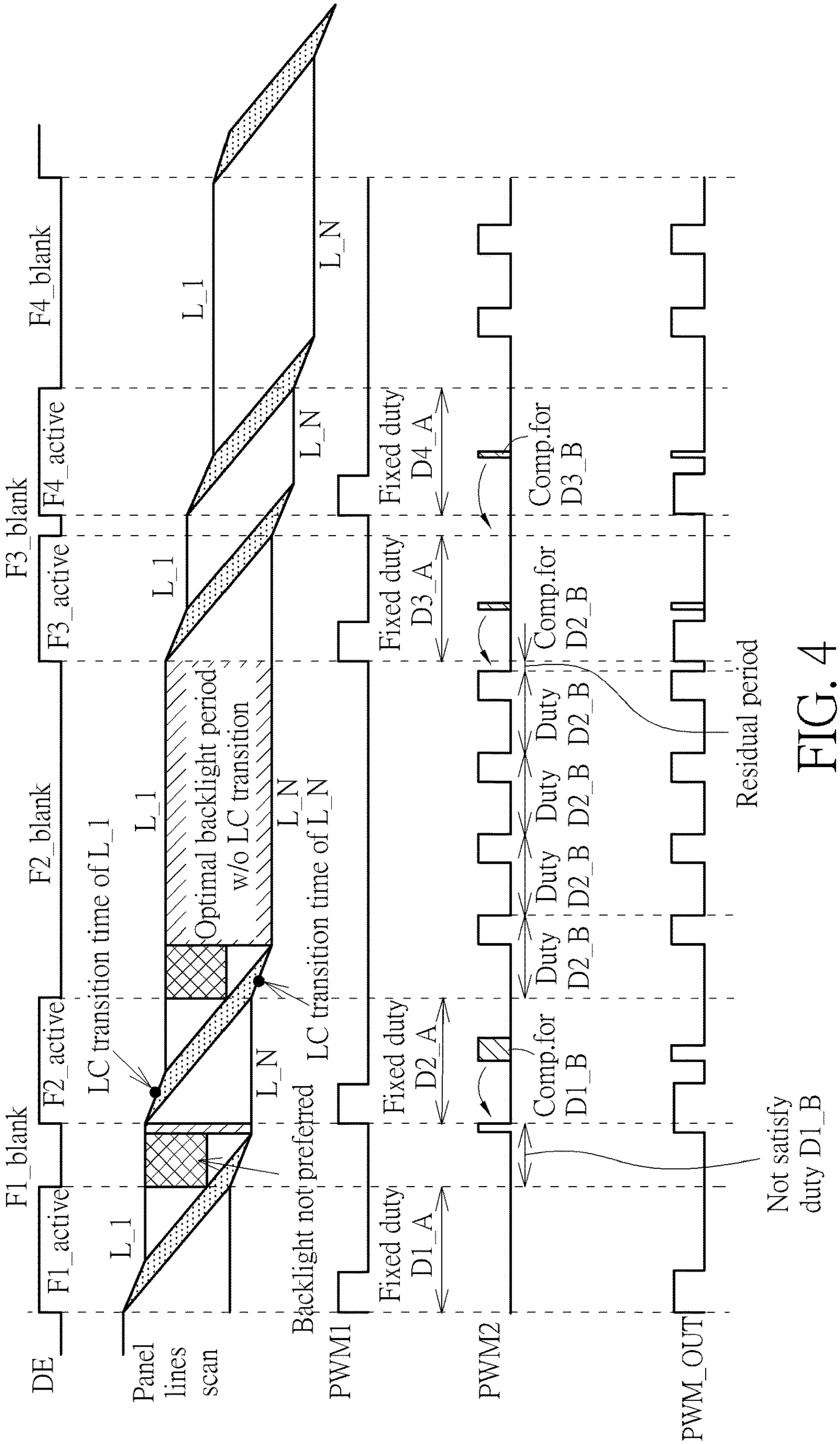
FIG. 4 is a waveform diagram of another backlight control scheme for a VRR display system according to an embodiment of the present invention.

FIG. 4 is a waveform diagram of another backlight control scheme for a VRR display system according to an embodiment of the present invention. The detailed operations of backlight control shown in FIG. 4 is similar to those shown in FIG. 3, so signals having similar functions are denoted by the same symbols. The difference between FIG. 4 and FIG. 3 is that, the embodiment of FIG. 4 does not include the backlight control signal PWM3 output by the third signal generator 224. In other words, the third signal generator 224 of the display driver circuit 204 may be disabled, or the display driver circuit 204 of the display system. 20 may not include the third signal generator 224 (only two signal generators or PWM generators are included).

Without the third signal generator 224, the backlight control signal PWM2 generated by the second signal generator 222 may be applied to the scenario where the blank period is longer. As shown in FIG. 4, in the frame period F2 where the blank period is longer and ends after the end time of the first pulse of the backlight control signal PWM2, the backlight control signal PWM2 may further have at least one pulse having a specific width and duty cycle to achieve the desired backlight duty cycle D2_B of the blank period of the frame period F2. For example, the second signal generator 222 may continuously output the pulses having the same width and gap (i.e., the same duty cycle) in the same frequency until the end of the blank period of the frame period F2. The residual time not satisfying the backlight duty cycle D2_B will be compensated by using a compensation pulse in the next frame period F3, and this compensation pulse may be calculated and generated in a similar way as in the above embodiments.

Based on the above backlight control scheme, the backlight duty cycle may be achieved by providing the backlight control signals separately in the fixed active period and the variable blank period. As for a frame period configured with a desired backlight duty cycle, e.g., equal to 30%, the first backlight control signal including a fixed pulse is used to achieve the 30% duty cycle in the active period. In the blank period, the pulse(s) of the second backlight control signal is generated after the end of the LC transition time, and the width of the pulse(s) may be well controlled to be adaptive to the 30% duty cycle in the blank period. Due to the uncertain length of the blank period, the pulse width of the second backlight control signal may not reach the 30% duty cycle at the end of the blank period; hence, an additional compensation pulse may be generated in the active period of the next frame period, so as to satisfy the desired backlight duty cycle. In such a situation, if a series of frame periods are configured with the same backlight duty cycle, the pulse signals in a blank period and the next active period may totally achieve the desired backlight duty cycle, so as to keep the overall backlight duty cycle consistent.

Please note that the present invention aims at providing a backlight control method and a related display driver circuit for improving the visual effects in the VRR display system. Those skilled in the art may make modifications and alterations accordingly. For example, in the above embodiments, the backlight control method is applied to a VRR display system having a variable blank period. In another embodiment, the backlight control method is also applicable to a display system having a fixed refresh rate. In addition, in the above embodiments, the display panel receives a global backlight control output signal; that is, the backlight of the entire panel is controlled by using the same signal. In another embodiment, the display panel may be divided into a plurality of regions, and the backlight module of the display panel includes multiple sets of LEDs, where each set of LEDs is responsible to provide backlight for one of the regions. Therefore, the display driver circuit may provide different backlight control output signals for different sets of LEDs to realize the partition backlight control.

For example, the display panel may be divided into multiple regions from top to bottom. Based on the scan sequence of display operations, different regions may have different LC transition time, where the LC transition time of the upper regions may start and end earlier, and the LC transition time of the lower regions may start and end later. Therefore, the backlight control output signals for different regions may be output with different delays, so as to allocate the pulses of the backlight control output signals to be staggered with the LC transition time of the corresponding region. For example, the pulses of the backlight control output signal for the upper regions may be output with a shorter delay, and the pulses of the backlight control output signal for the lower regions may be output with a longer delay.

Figure 5:
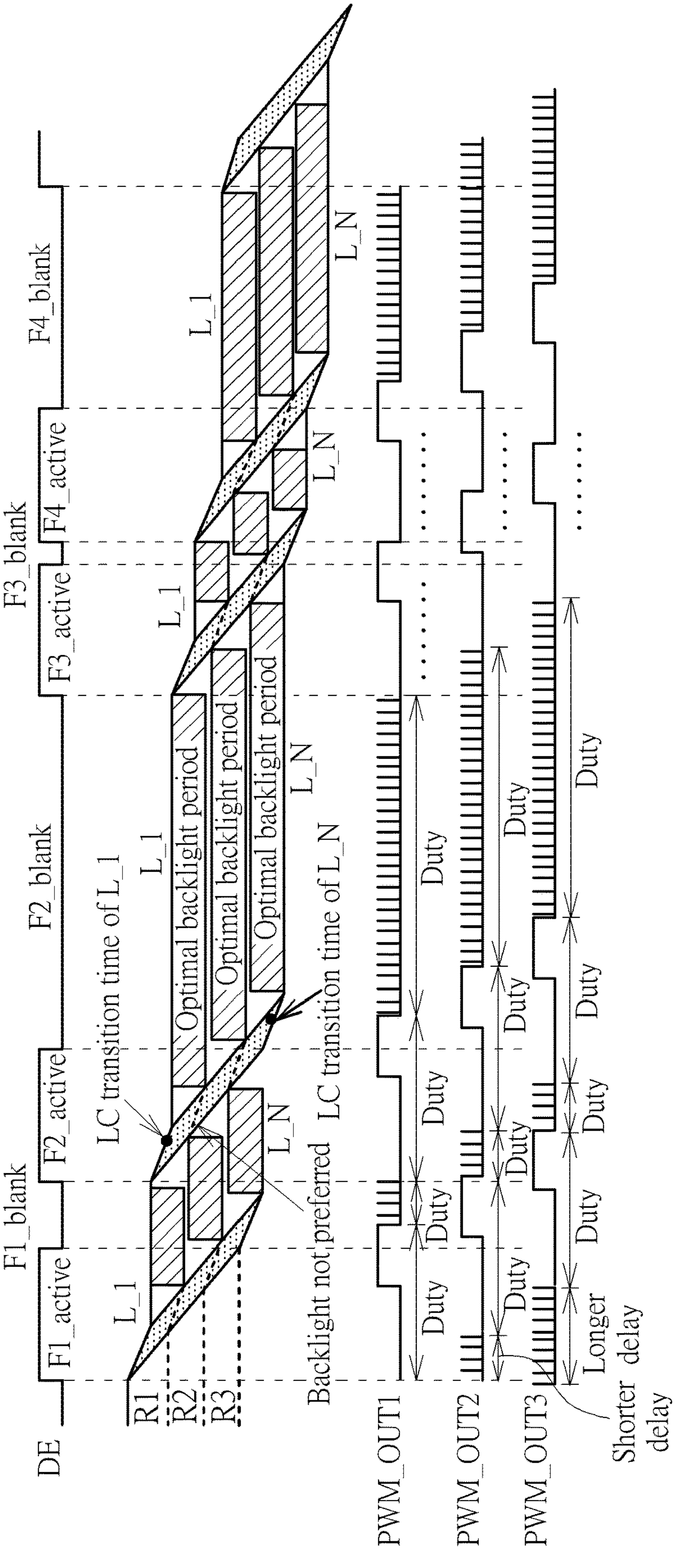
FIG. 5 is a waveform diagram of a backlight control scheme for a VRR display system with partition backlight control according to an embodiment of the present invention.

FIG. 5 is a waveform diagram of a backlight control scheme for a VRR display system with partition backlight control according to an embodiment of the present invention. As shown in FIG. 5, the display panel is divided into three regions R1-R3, which are controlled by using three backlight control output signals PWM_OUT1, PWM_OUT2 and PWM_OUT3, respectively. Based on the partition backlight control, the length of the LC transition time of each region is reduced significantly as compared to the embodiment of global backlight control as described above, the backlight control output signals PWM_OUT1, PWM_OUT2 and PWM_OUT3 may be arranged so that none of their pulses overlaps the LC transition time. In such a situation, the partition backlight control may achieve a better visual effect without the blurred images.

For example, in the backlight control output signal PWM_OUT1 for the region R1, a pulse having a specific width is generated to achieve the backlight duty cycle of each active period, and the pulse may be delayed to start at or after the end of the LC transition time. Subsequently, a series of small pulses are generated to achieve the backlight duty cycle of each variable blank period. The duty cycle of the small pulses may be identical to the desired backlight duty cycle to be achieved in the blank period; hence, the overall duty cycle of the blank period can approach the desired backlight duty cycle. Such small pulses may be output continuously until the start of the LC transition time of the next frame. Since the actual duty cycle of the blank period achieved by the small pulses approaches the desired backlight duty cycle, no compensation pulse is required.

As shown in FIG. 5, the regions R1-R3 have different LC transition times, and thus the backlight control output signals PWM_OUT1, PWM_OUT2 and PWM_OUT3 may be delayed differently, to be prevented from overlapping with the LC transition times. Since different regions are usually configured to have the same brightness setting in the same frame period, their duty cycles may be the same. Therefore, the backlight control output signals PWM_OUT1, PWM_OUT2 and PWM_OUT3 may include pulses having the same widths and patterns, which are output to different regions with different delays. For example, the backlight control output signal PWM_OUT2 may have a delay relative to the backlight control output signal PWM_OUT1, and the backlight control output signal PWM_OUT3 may have a delay relative to the backlight control output signal PWM_OUT2. From another point of view, the backlight control output signal PWM_OUT2 may have a shorter delay relative to the backlight control output signal PWM_OUT1, and the backlight control output signal PWM_OUT3 may have a longer delay relative to the backlight control output signal PWM_OUT1.

Figure 6:
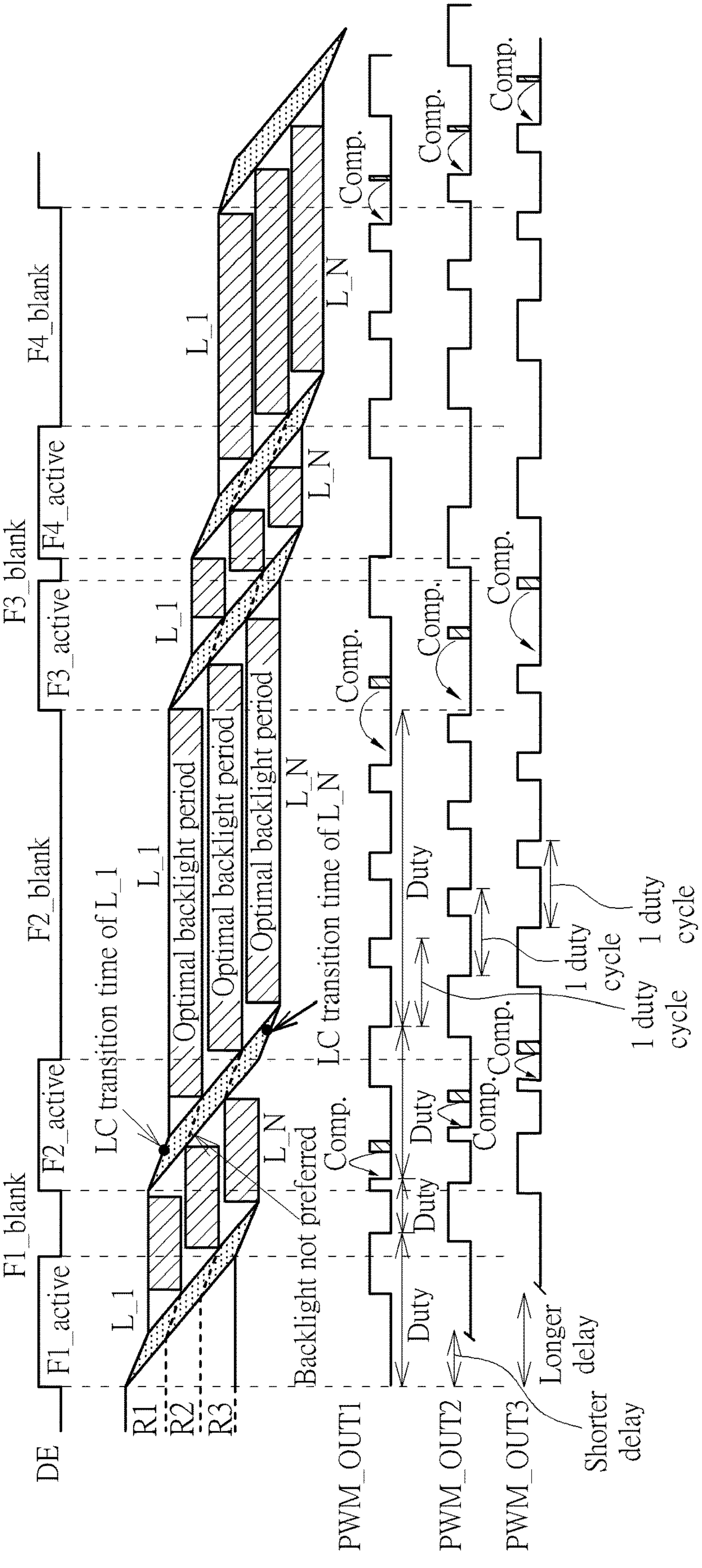
FIG. 6 is a waveform diagram of another backlight control scheme for a VRR display system with partition backlight control according to an embodiment of the present invention.

FIG. 6 is a waveform diagram of another backlight control scheme for a VRR display system with partition backlight control according to an embodiment of the present invention. The detailed operations of backlight control shown in FIG. 6 are similar to those shown in FIG. 5, so signals having similar functions are denoted by the same symbols. The difference between FIG. 6 and FIG. 5 is that, the embodiment of FIG. 6 applies one or more larger pulses in the backlight control output signal used for the blank period. The pulse width and gap satisfy the desired duty cycle, and a compensation pulse may be required in the next frame period to compensate for the residual time in the blank period. The compensation pulse may be shifted or adjusted to any appropriate place staggered with other pulses of the same backlight control output signal.

Figure 7A:
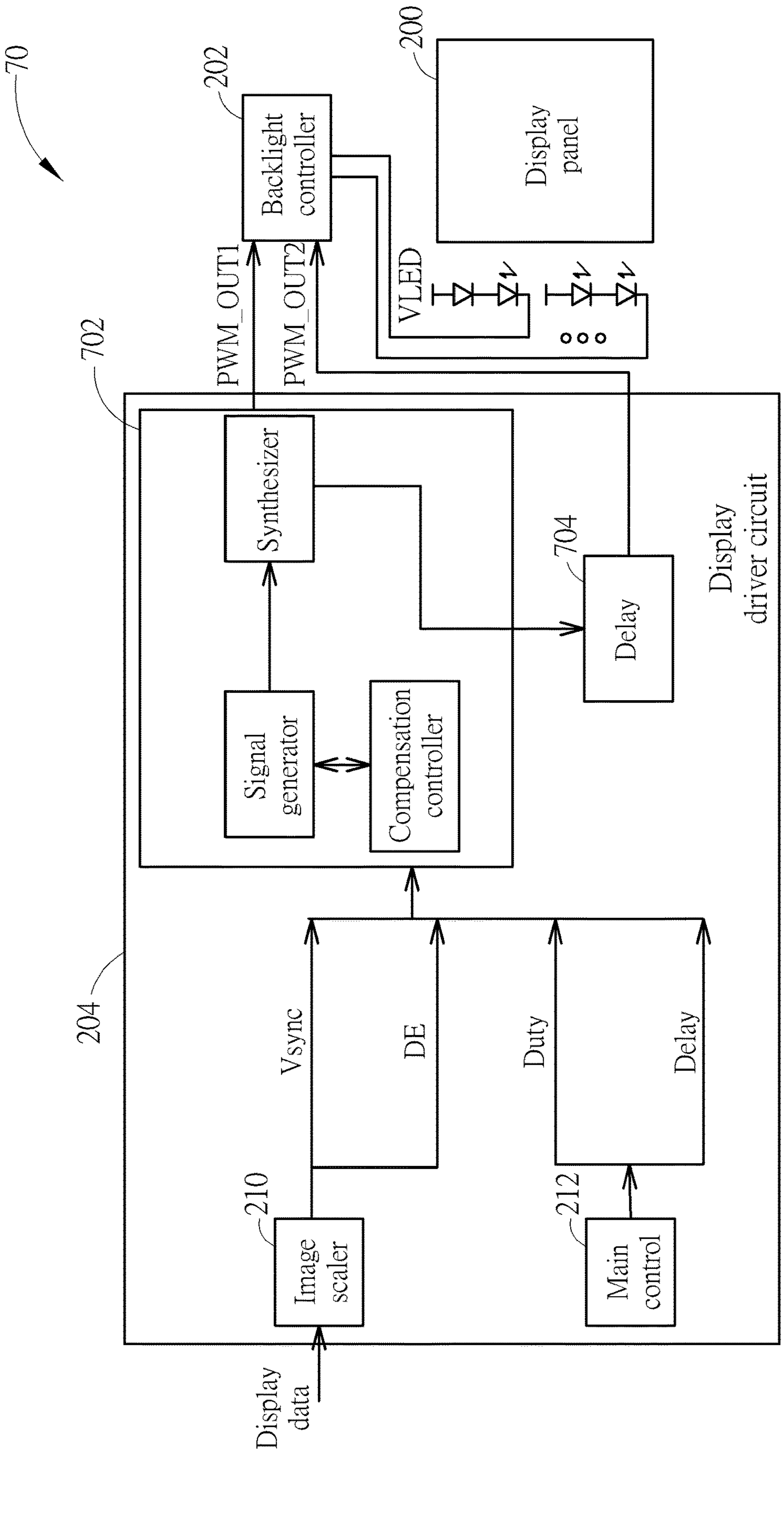
FIG. 7A and FIG. 7B are schematic diagrams of a display system for realizing partition backlight control according to embodiments of the present invention.

FIG. 7A is a schematic diagram of a display system 70 for realizing partition backlight control according to an embodiment of the present invention. The structure of the display system 70 is similar to the structure of the display system 20 as shown in FIG. 2A, so signals and elements having similar functions are denoted by the same symbols. As shown in FIG. 7A, the display driver circuit 204 of the display system 70 includes an output circuit 702 and a delay circuit 704. The output circuit 702, which is configured to output a backlight control output signal PWM_OUT1, may include a compensation controller, a synthesizer, and two or three signal generators as the implementation shown in FIG. 2A, or include a compensation controller, a synthesizer, and only one signal generator as the implementation shown in FIG. 2B. The delay circuit 704 is coupled to the output circuit 702, and may be implemented with any circuit elements capable of delay functions, such as a delay chain composed of a plurality of inverters. The delay circuit 704 may insert a delay to the backlight control output signal PWM_OUT1 to generate a backlight control output signal PWM_OUT2. The backlight control output signals PWM_OUT1 and PWM_OUT2 may be used for two different regions of the display panel.

In another embodiment, the display driver circuit may include more than one delay circuit having different delay times, or the delay circuit is capable of outputting multiple backlight control output signals having different delay times, so as to provide more backlight control output signals which are delayed differently.

Figure 7B:
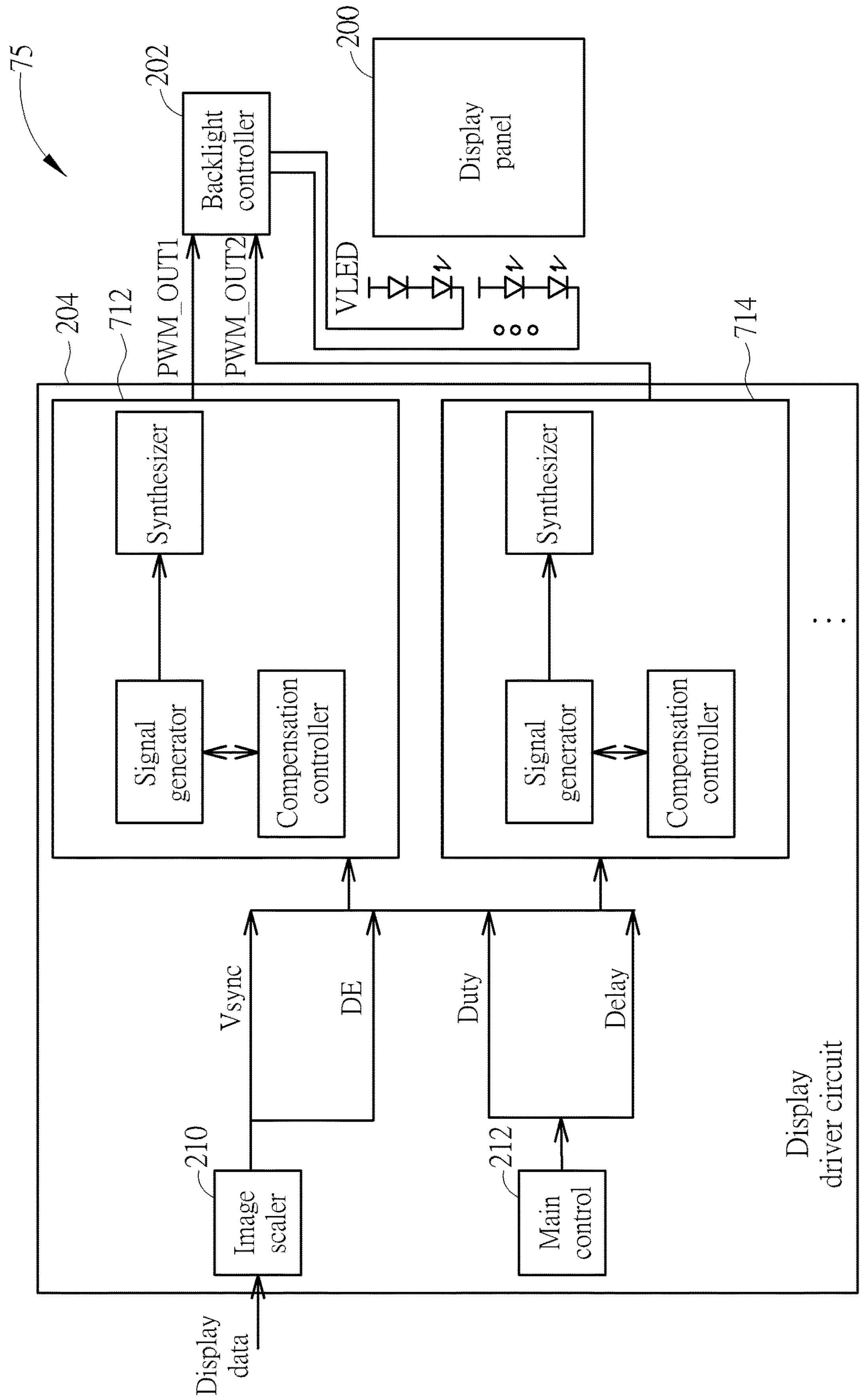

FIG. 7B is a schematic diagram of another display system 75 for realizing partition backlight control according to an embodiment of the present invention. The structure of the display system 75 is similar to the structure of the display system 20 as shown in FIG. 2A, so signals and elements having similar functions are denoted by the same symbols. As shown in FIG. 7B, the display driver circuit 204 of the display system 75 includes output circuits 712 and 714, for outputting backlight control output signals PWM_OUT1 and PWM_OUT2, respectively. Each of the output circuits 712 and 714 may include a compensation controller, a synthesizer, and two or three signal generators as the implementation shown in FIG. 2A, or include a compensation controller, a synthesizer, and only one signal generator as the implementation shown in FIG. 2B. Similarly, the backlight control output signals PWM_OUT1 and PWM_OUT2 may be used for two different regions of the display panel.

In another embodiment, the display driver circuit may include three or more output circuits, for generating and outputting three or more backlight control output signals having different delay times, to be used for different regions of the display panel. Since each output circuit has a respective compensation controller for timing/delay control, these backlight control output signals are generated independently.

Figure 8:
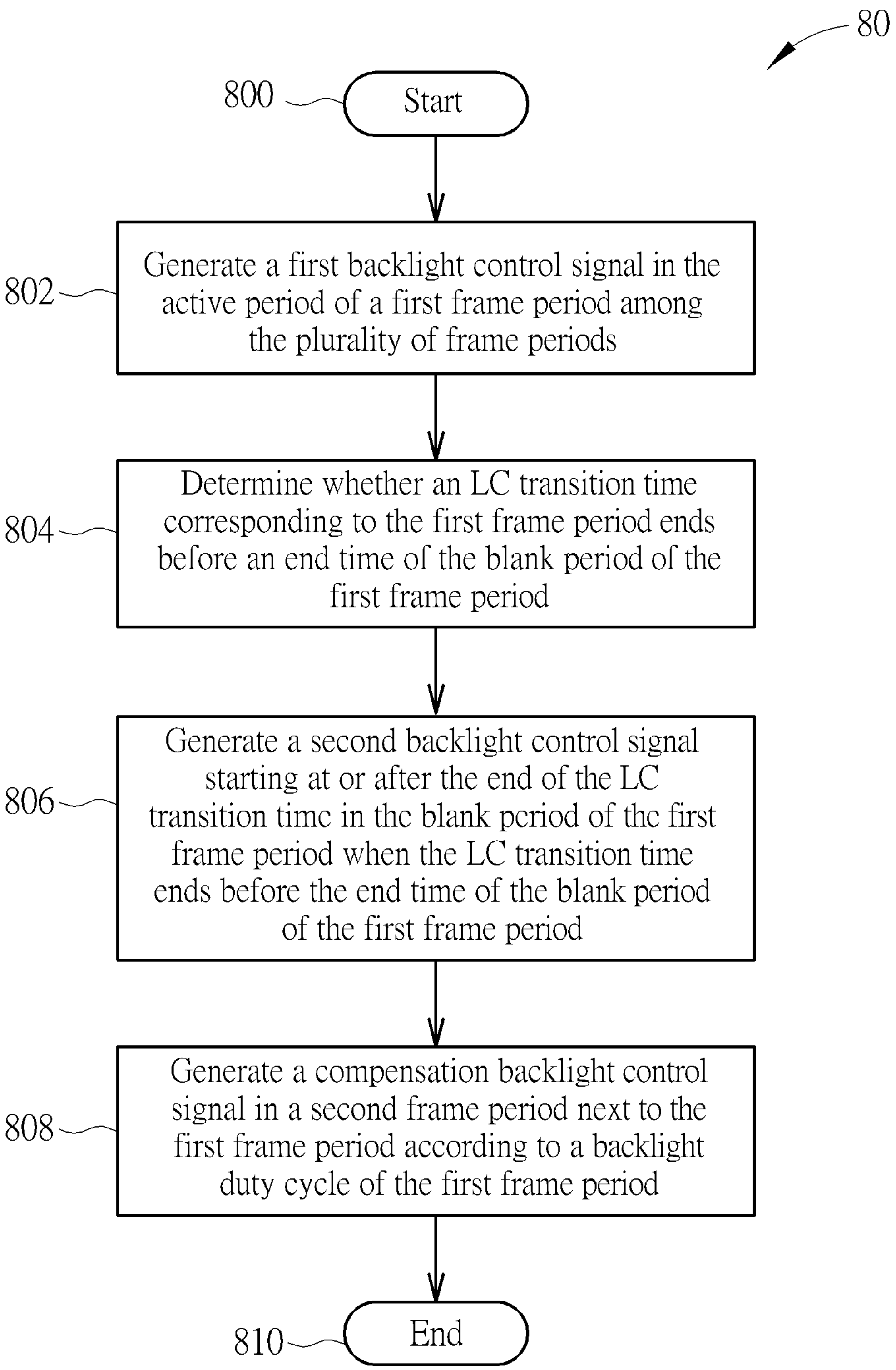
FIG. 8 is a flowchart of a backlight control process according to an embodiment of the present invention.

The abovementioned operations of backlight control may be summarized into a backlight control process 80, as shown in FIG. 8. The backlight control process 80 may be implemented in a display driver circuit of a VRR display system, such as the display driver circuit 204 shown in FIG. 2A, 2B, 7A or 7B, to control the backlight of the display panel under a variable blank period. As shown in FIG. 8, the backlight control process 80 includes the following steps:

Step 800: Start.

Step 802: Generate a first backlight control signal in the active period of a first frame period among the plurality of frame periods.

Step 804: Determine whether an LC transition time corresponding to the first frame period ends before an end time of the blank period of the first frame period.

Step 806: Generate a second backlight control signal starting at or after the end of the LC transition time in the blank period of the first frame period when the LC transition time ends before the end time of the blank period of the first frame period.

Step 808: Generate a compensation backlight control signal in a second frame period next to the first frame period according to a backlight duty cycle of the first frame period.

Step 810: End.

The detailed implementations and alterations of the backlight control process 80 are illustrated in the above paragraphs, and will not be repeated herein.

To sum up, the present invention provides a novel backlight control scheme for a VRR display system, where each frame period may be divided into a fixed active period and a variable blank period. A first backlight control signal having a fixed pulse is used to achieve the backlight duty cycle of the active period. A second backlight control signal having a series of pulses is used to achieve the backlight duty cycle of the blank period. If the backlight duty cycle of the blank period is not satisfied due to the uncertain length of the blank period, or if the blank period is not long enough to contain the expected pulse width for reaching the backlight duty cycle, a compensation pulse may be generated in the active period of the next frame period, to compensate for the lacking part of the pulse width and/or the residual time of the blank period. In such a situation, the overall backlight duty cycle may achieve its desired value, and it is feasible to make the backlight duty cycle consistent over a series of frame periods. The backlight control output signals of the present invention may be applied to global backlight control or partition backlight control of the display panel. In an embodiment, the pulses of the backlight control signal may be staggered with the LC transition time, so as to avoid the blurred image. This function is more effective when the partition backlight control is utilized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of backlight control for a display panel, the display panel being configured to display with a variable refresh rate in a plurality of frame periods, each having a fixed period and a variable period, the method comprising:

generating a first backlight control signal in the fixed period of a first frame period among the plurality of frame periods;

determining whether a liquid crystal molecule transition time corresponding to the first frame period ends before an end time of the variable period of the first frame period;

generating a second backlight control signal in a time period not overlapping the liquid crystal molecule transition time within the variable period of the first frame period when the liquid crystal molecule transition time ends before the end time of the variable period of the first frame period; and generating a compensation backlight control signal to compensate fora backlight of the first frame period in a second frame period next to the first frame period according to a backlight duty cycle of the first frame period.

2. The method of claim 1, wherein the second backlight control signal starts at a time point determined according to the liquid crystal molecule transition time.

3. The method of claim 1, wherein the second backlight control signal starts at or after the end of the liquid crystal molecule transition time.

4. The method of claim 1, further comprising:

combining the first backlight control signal, the second backlight control signal and the compensation backlight control signal to generate a first backlight control output signal; and outputting the first backlight control output signal to a backlight controller of the display panel.

5. The method of claim 4, wherein the display panel is divided into a plurality of regions, and the first backlight control output signal is used for a first region among the plurality of regions.

6. The method of claim 5, wherein a second backlight control output signal used for a second region among the plurality of regions and the first backlight control output signal used for the first region are delayed differently according to the liquid crystal molecule transition time.

7. The method of claim 5, wherein a second backlight control output signal used for a second region among the plurality of regions and the first backlight control output signal used for the first region are generated independently.

8. The method of claim 1, wherein the compensation backlight control signal in the fixed period of the second frame period is staggered with another backlight control signal for the second frame period.

9. The method of claim 1, wherein the first backlight control signal comprises a first pulse having a width corresponding to the backlight duty cycle of the first frame period.

10. The method of claim 1, wherein the second backlight control signal comprises a second pulse, and a width of the second pulse is equal to an expected width corresponding to the backlight duty cycle of the first frame period when the variable period of the first frame period is long enough to contain the second pulse having the expected width.

11. The method of claim 10, further comprising:

generating a third backlight control signal in the variable period of the first frame period after the end of the second pulse, wherein the third backlight control signal comprises at least one third pulse, and the number of the at least one third pulse corresponds to a length of the variable period of the first frame period.

12. The method of claim 10, wherein the second backlight control signal further comprises at least one fourth pulse after the end of the second pulse, and each of the at least one fourth pulse has a specific width corresponding to the backlight duty cycle of the first frame period.

13. The method of claim 12, wherein the compensation backlight control signal comprises a compensation pulse to compensate for the backlight duty cycle of the first frame period, and the method further comprises:

calculating a width of the compensation pulse according to the at least one fourth pulse and the backlight duty cycle of the first frame period.

14. The method of claim 1, wherein the second backlight control signal comprises a second pulse, and the second pulse ends at the end time of the variable period of the first frame period when the variable period of the first frame period is not long enough to contain an expected width of the second pulse, wherein the expected width corresponds to the backlight duty cycle of the first frame period.

15. The method of claim 14, wherein the compensation backlight control signal comprises a compensation pulse to compensate for the backlight duty cycle of the first frame period, and the method further comprises:

calculating a width of the compensation pulse according to the second pulse and the backlight duty cycle of the first frame period, wherein a width of the compensation pulse is equal to the expected width minus an actual width of the second pulse.

16. A display driver circuit for performing backlight control for a display panel, the display panel being configured to display with a variable refresh rate in a plurality of frame periods, each having a fixed period and a variable period, the display driver circuit comprising:

a first signal generator, configured to generate a first backlight control signal in the fixed period of a first frame period among the plurality of frame periods;

a main control circuit, configured to determine whether a liquid crystal molecule transition time corresponding to the first frame period ends before an end time of the variable period of the first frame period; and a second signal generator, configured to generate a second backlight control signal in a time period not overlapping the liquid crystal molecule transition time within the variable period of the first frame period when the liquid crystal molecule transition time ends before the end time of the variable period of the first frame period, and generate a compensation backlight control signal to compensate for a backlight of the first frame period in a second frame period next to the first frame period according to a backlight duty cycle of the first frame period.

17. The display driver circuit of claim 16, wherein the second backlight control signal starts at a time point determined according to the liquid crystal molecule transition time.

18. The display driver circuit of claim 16, wherein the second backlight control signal starts at or after the end of the liquid crystal molecule transition time.

19. The display driver circuit of claim 16, further comprising:

a synthesizer, configured to combine the first backlight control signal, the second backlight control signal and the compensation backlight control signal to generate a first backlight control output signal, and output the first backlight control output signal to a backlight controller of the display panel.

20. The display driver circuit of claim 19, wherein the display panel is divided into a plurality of regions, and the first backlight control output signal is used for a first region among the plurality of regions.

21. The display driver circuit of claim 20, wherein a second backlight control output signal used for a second region among the plurality of regions and the first backlight control output signal used for the first region are delayed differently according to the liquid crystal molecule transition time.

22. The display driver circuit of claim 20, wherein a second backlight control output signal used for a second region among the plurality of regions and the first backlight control output signal used for the first region are generated independently.

23. The display driver circuit of claim 16, wherein the compensation backlight control signal in the fixed period of the second frame period is staggered with another backlight control signal for the second frame period.

24. The display driver circuit of claim 16, wherein the first backlight control signal comprises a first pulse having a width corresponding to the backlight duty cycle of the first frame period.

25. The display driver circuit of claim 16, wherein the second backlight control signal comprises a second pulse, and a width of the second pulse is equal to an expected width corresponding to the backlight duty cycle of the first frame period when the variable period of the first frame period is long enough to contain the second pulse having the expected width.

26. The display driver circuit of claim 25, further comprising:

a third signal generator, configured to generate a third backlight control signal in the variable period of the first frame period after the end of the second pulse, wherein the third backlight control signal comprises at least one third pulse, and the number of the at least one third pulse corresponds to a length of the variable period of the first frame period.

27. The display driver circuit of claim 25, wherein the second backlight control signal further comprises at least one fourth pulse after the end of the second pulse, and each of the at least one fourth pulse has a specific width corresponding to the backlight duty cycle of the first frame period.

28. The display driver circuit of claim 27, wherein the compensation backlight control signal comprises a compensation pulse to compensate for the backlight duty cycle of the first frame period, and the display driver circuit further comprises:

a compensation controller, configured to calculate a width of the compensation pulse according to the at least one fourth pulse and the backlight duty cycle of the first frame period.

29. The display driver circuit of claim 16, wherein the second backlight control signal comprises a second pulse, and the second pulse ends at the end time of the variable period of the first frame period when the variable period of the first frame period is not long enough to contain an expected width of the second pulse, wherein the expected width corresponds to the backlight duty cycle of the first frame period.

30. The display driver circuit of claim 29, wherein the compensation backlight control signal comprises a compensation pulse to compensate for the backlight duty cycle of the first frame period, and the display driver circuit further comprises:

a compensation controller, configured to calculate a width of the compensation pulse according to the second pulse and the backlight duty cycle of the first frame period, wherein a width of the compensation pulse is equal to the expected width minus an actual width of the second pulse.

31. A display driver circuit for performing backlight control for a display panel, the display panel being configured to display with a variable refresh rate in a plurality of frame periods, each having a fixed period and a variable period, the display driver circuit comprising:

a signal generator, configured to generate a first backlight control signal in the fixed period of a first frame period among the plurality of frame periods; and a main control circuit, configured to determine whether a liquid crystal molecule transition time corresponding to the first frame period ends before an end time of the variable period of the first frame period;

wherein the signal generator is further configured to generate a second backlight control signal in a time period not overlapping the liquid crystal molecule transition time within the variable period of the first frame period when the liquid crystal transition time ends before the end time of the variable period of the first frame period, and generate a compensation backlight control signal to compensate for a backlight of the first frame period in a second frame period next to the first frame period according to a backlight duty cycle of the first frame period.

* * * * *